United States Patent [19]
Watson

[11] Patent Number: 5,227,909
[45] Date of Patent: Jul. 13, 1993

[54] SINGLE COIL DIGITIZER-COUPLED IMAGE SCANNER

[75] Inventor: James S. Watson, Phoenix, Ariz.

[73] Assignee: CalComp Inc., Anaheim, Calif.

[21] Appl. No.: 767,462

[22] Filed: Sep. 30, 1991

[51] Int. Cl.⁵ .................. G02B 26/08; G06K 7/10; G06K 9/22
[52] U.S. Cl. .................. 359/196; 235/472; 382/59; 358/473
[58] Field of Search .............. 359/196; 382/59, 62, 382/67; 340/710; 250/566, 568; 235/462, 463, 472; 358/473, 474, 488

[56] References Cited

U.S. PATENT DOCUMENTS

| | | | |
|---|---|---|---|
| 4,581,761 | 4/1986 | Ichinokawa et al. | 340/710 |
| 4,901,164 | 2/1990 | Kurosawa | 382/59 |
| 5,003,164 | 3/1991 | Barkan | 235/472 |
| 5,051,736 | 9/1991 | Bennett et al. | 340/707 |

*Primary Examiner*—Bruce Y. Arnold
*Assistant Examiner*—James Phan
*Attorney, Agent, or Firm*—Donald A. Streck; Wm. F. Porter, Jr.

[57] ABSTRACT

A hand-operated optical scanning system which can be used to scan a large document in multiple passes. There is a digitizing tablet containing position-sensing circuitry for outputting a signal indicating the position of a sensing coil in an x-y coordinate system associated with a working surface of the digitizing tablet as well as a buffer memory for receiving pixelized data associated with optical scanning of a document. A hand scanner for scanning the document comprises, a case having a longitudinal axis, guide rollers for allowing movement of the case only substantially along the longitudinal axis, a read bar centered on the longitudinal axis and perpendicular thereto for optically scanning a one-dimensional line of pixels and for outputting a signal reflecting an instantaneous scanned image, and a sensing coil carried by the case centered on the longitudinal axis at a pre-established distance from the read bar for being positionally sensed by the position-sensing circuitry of the digitizing tablet. There is also logic for continuously determining the position and orientation of the read bar, inputting the signal from the read bar, and storing pixelized information into locations of the buffer memory associated with respective locations of the document in the x-y coordinate system.

15 Claims, 3 Drawing Sheets

SINGLE COIL DIGITIZER-COUPLED IMAGE SCANNER

BACKGROUND OF THE INVENTION

This invention relates to image scanners and, more particularly, to a hand-operated optical scanning system comprising, a digitizing tablet containing position-sensing circuitry for outputting a signal indicating the position of a sensing coil in an x-y coordinate system associated with a working surface of the digitizing tablet; buffer memory means for receiving pixelized data associated with optical scanning of a document attached to the working surface of the digitizing tablet; a hand scanner for manual movement over the working surface of the digitizing tablet to scan a document attached to the working surface of the digitizing tablet, the hand scanner comprising, a case having a longitudinal axis, guide means carried by the case for allowing movement of the case over the working surface of the digitizing tablet only in a direction substantially along the longitudinal axis, read bar means carried by the case centered on the longitudinal axis and perpendicular thereto for optically scanning a one-dimensional line of pixels and for outputting a signal reflecting an instantaneous scanned image, and sensing coil means carried by the case centered on the longitudinal axis at a pre-established distance from the read bar means for being positionally sensed by the position-sensing circuitry of the digitizing tablet; and, logic means connected to outputs from the digitizing tablet and the read bar means and to the buffer memory means for continuously determining instantaneous positions and orientation of the read bar means in the x-y coordinate system as the hand scanner is scanned over a document attached to the working surface of the digitizing tablet, for continuously inputting the signal from the read bar means, and for storing pixelized information about the document into locations of the buffer memory means associated with respective locations of the document in the x-y coordinate system.

Image scanners for use with computers have long been recognized as providing great additional capability to the computer. Early scanners were very expensive, large, and cumbersome but did allow a page of previously-typed text to be scanned and optically character recognized and, thereby, input to the computer without the necessity for retyping. Similarly, drawings, and the like, could be scanned and digitized automatically, thereby eliminating the necessity for a human operator to manually digitize the data with a digitizing tablet system.

The compact optical scanning capabilities developed for facsimile machines and the like quickly led to the introduction of cheaper and les cumbersome page scanners for use with computers. More recently, such technology has been miniaturized and greatly simplified into hand scanning devices such as that shown in FIG. 1 which can be purchased for as little as one hundred dollars or less. Such hand scanners are not without certain limitations, however. The scanner 10 comprises a hand-holdable plastic case 12 in which is disposed a read bar 14 connected to the scanner logic 16. The read bar 14 is disposed over a slot 18 in the bottom of the case 12 so that as the case 12 is slid over a document or the like to be optically scanned, the read bar 14 can "see" through the slot 18. There are also rollers 20 mounted on shafts 21 passing through slots 22 in the bottom of the case 12 which roll along the document as the case 12 is "scanned" by hand over the document. The roller-carrying shafts 21 are mounted on their outer ends to supports 24 and are connected on their inner ends to a common transducer 26 which also outputs a signal to the scanner logic 16 indicating the direction and rate of movement of the rollers 20 and, thereby, the case 12 and read bar 14. The width of the scan pass is pre-determined by the length or width of the read bar 14. The length of the area that can be scanned by the scanner 10 is determined and limited by the size of a date input buffer (not shown) associated therewith. The scanner logic 16 of the scanner 10 only knows two things about the scanning action. The first is the width of the read bar 14. The second is that the read bar 14 is perpendicular to the path of movement of the case 12. Thus, as a user scans the case 12 over a document, the scanner logic 16 only knows that the read bar 14 is moving either forward or backward along a path of motion to which the read bar 14 is perpendicular. Thus, the pixelized data has no other orientation except for relation to the direction of scanning. Obviously, in such a system, larger areas cannot be scanned additively by multiple passes of the scanner 10.

Ichinokawa in U.S. Pat. No. 4,581,761, discloses a hand-held scanner 28 to be employed in combination with a digitizing tablet 30. The scanner 28 as shown in FIG. 2, again has a case 12, including a read bar 14 disposed over a slot 18. There is also scanner logic 16' connected to the read bar 14, as well as to a pair of sensing coils 32. The basic premise of the Ichinokawa scanner 28 is that a document to be scanned is temporarily attached to the surface of the digitizing tablet 30 and then scanned with the scanner 28. Since the position and orientation of the scanner 28 and read bar 14 are known in this system, multiple passes of the scanner 28 can be employed to create a larger scan input. This is because there are two coils 32 and, therefore, the position of the scanner 28 and thereby the read bar 14, on the surface of the digitizing tablet 30 (and thereby the document) can be determined. Thus, the scanner 28 knows the orientation of the scanned material with respect to up/down and left/right, as well as its exact position, so that the pixelized version of the scanned document can be created through multiple passes into a page memory (not shown) associated therewith. The problem with the Ichinokawa approach of FIG. 2 is that standard digitizer tablet systems do not employ circuitry for independently sensing the positions of dual coils and, therefore, a complete system including the scanner 28 and the associated digitizing tablet 30 would have to be implemented in order to commercially manufacture a hand-scanning system according to the Ichinokawa approach.

Wherefore, it is the object of this invention to provide a hand-held scanner for use with a standard, single-coil-sensing digitizing tablet system which can scan a large document in multiple passes through the use of positional and orientation information provided by the digitizer table portion of the system.

Other objects and benefits of the invention will become apparent from the detailed description which follows hereinafter when taken in conjunction with the drawing figures which accompany it.

SUMMARY

The foregoing object has been achieved by the hand-operated optical scanning system of the present invention comprising, a digitizing tablet containing position-sensing circuitry for outputting a signal indicating the position of a sensing coil in an x-y coordinate system associated with a working surface of the digitizing tablet; buffer memory means for receiving pixelized data associated with optical scanning of a document attached to the working surface of the digitizing tablet; a hand scanner for manual movement over the working surface of the digitizing tablet to scan a document attached to the working surface of the digitizing tablet, the hand scanner comprising, a case having a longitudinal axis, guide means carried by the case for allowing movement of the case over the working surface of the digitizing tablet only in a direction substantially along the longitudinal axis, read bar means carried by the case centered on the longitudinal axis and perpendicular thereto for optically scanning a one-dimensional line of pixels and for outputting a signal reflecting an instantaneous scanned image, and sensing coil means carried by the case centered on the longitudinal axis at a pre-established distance from the read bar means for being positionally sensed by the position-sensing circuitry of the digitizing tablet; and, logic means connected to outputs from the digitizing tablet and the read bar means and to the buffer memory means for continuously determining instantaneous positions and orientation of the read bar means in the x-y coordinate system as the hand scanner is scanned over a document attached to the working surface of the digitizing tablet, for continuously inputting the signal from the read bar means, and for storing pixelized information about the document into locations of the buffer memory means associated with respective locations of the document in the x-y coordinate system.

In the preferred embodiment, the guide means comprises roller means carried by the case for allowing the case to roll over a document only substantially along the longitudinal axis. The the roller means may comprise a shaft disposed perpendicular to the longitudinal axis and carried by the case for rotation; and, a pair of rollers carried by outer ends of the shaft, the pair of rollers passing through respective ones of a pair of slots in a bottom surface of the case. In such case, one may wish to include transducer means carried by an inner portion of the shaft for outputting a signal to the logic means reflecting rotation of the shaft and thereby movement of the case substantially along the longitudinal axis. The the roller means may also comprise a pair of parallel spaced shafts disposed perpendicular to the longitudinal axis and carried by the case for rotation; and, a pair of roller belts carried by outer ends of the shafts, the pair of rollers passing through respective ones of a pair of slots in a bottom surface of the case.

DESCRIPTION OF THE PREFERRED EMBODIMENT

Figures 1, 2:
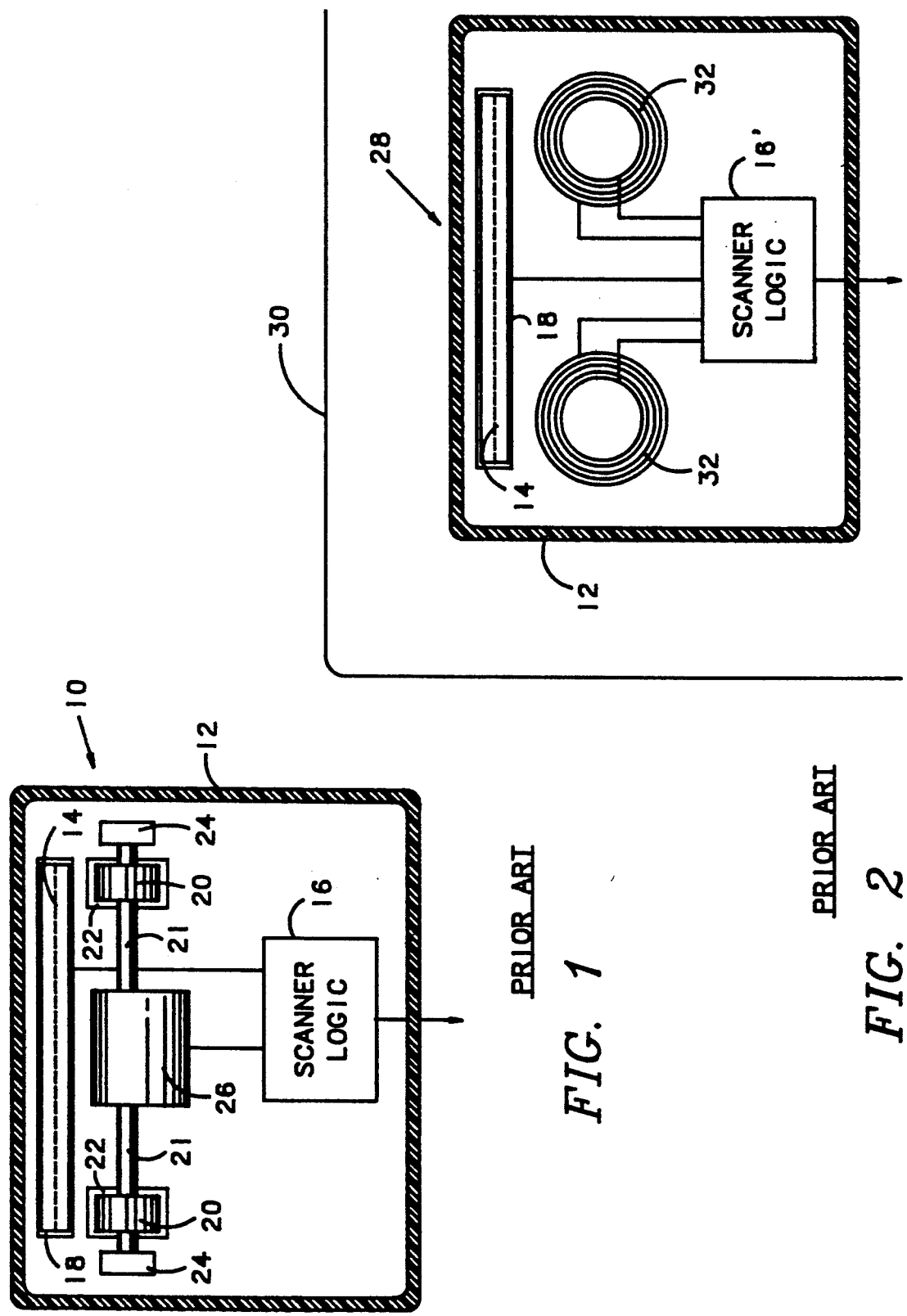
FIG. 1 is a simplified drawing of a prior art hand scanner according to one embodiment.
FIG. 2 is a simplified drawing of a hand scanner according to the prior art in a second embodiment associated with a digitizing tablet.
Figure 3:
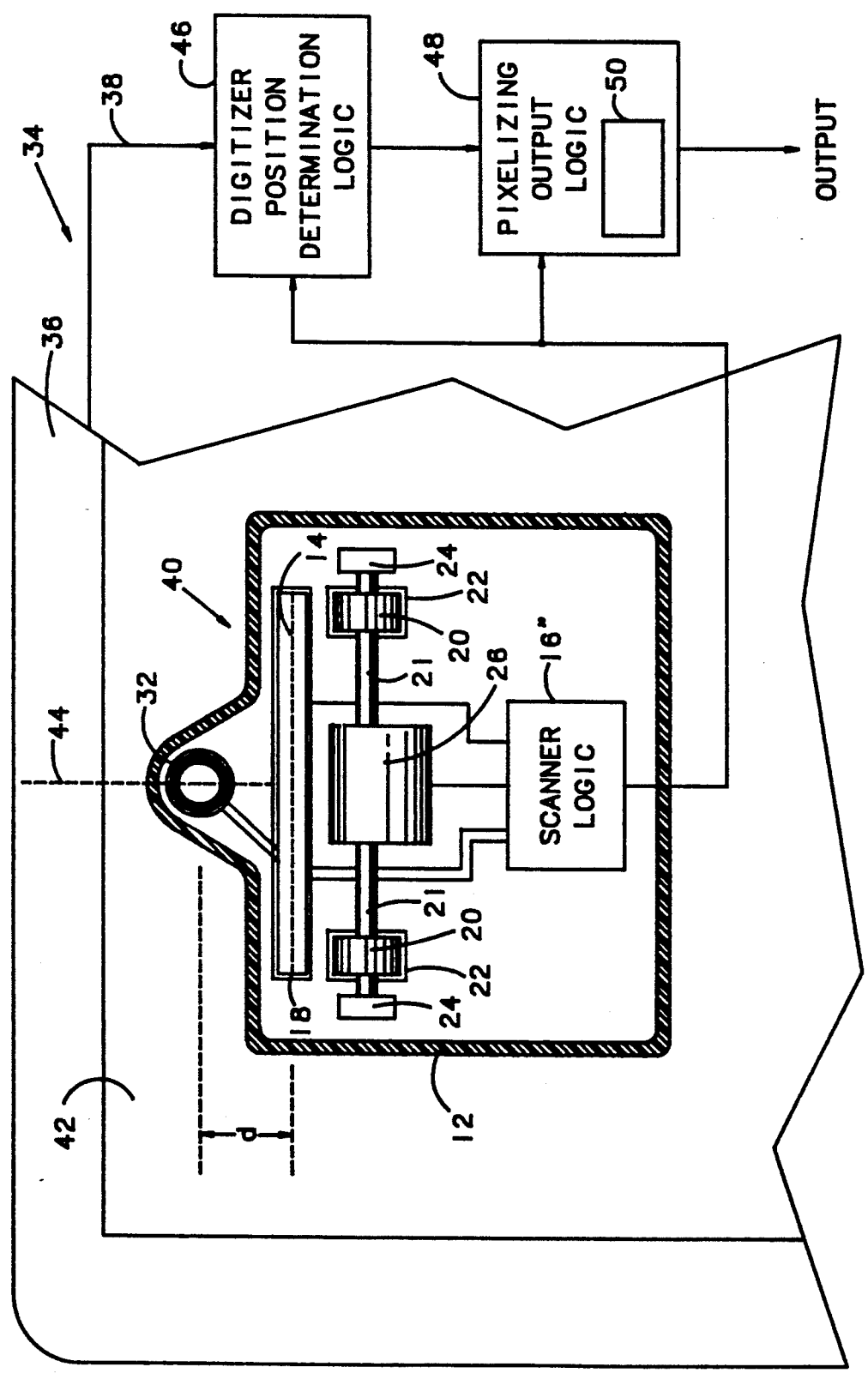
FIG.3 is a combined drawing and functional block diagram of a hand scanner according to the present invention in a first embodiment.

A hand scanning system according to the present invention is shown in FIG. 3 where it is generally indicated as 34. The system 34 comprises a digitizing tablet 36 of a standard variety which includes the capability of providing a signal on line 38 reflecting the position of a single coil. There is also a hand scanner 40 for movement over the surface of a document 42 attached to the surface of the digitizing tablet 36. The hand scanner 40 has a case 12 which, again, includes a read bar 14 disposed over a slot 18. It should be noted at this point that the term "read bar" as employed herein can comprise an actual bar having optical sensing elements along the length thereof, a mirror reflecting a one-dimensional scan image into a one-dimensional CCD device, or any other apparatus known or developed in the art for optically scanning a line of pixels and outputting a signal reflecting the scanned image; and, therefore, the use of that term in the description which follows and in the claims appended hereto is not to be taken as limiting in any way. As in the prior art scanner of FIG. 1, there are rollers 20 connected to a transducer 26 providing movement indication of the case 12 to scanner logic 16". To attain the objectives of the present invention, there is also a single sensing coil 32 connected to the scanner logic 16". As shown in FIG. 3, the single sending coil 32 is disposed along the longitudinal axis 44 of the case 12 and at a fixed distance "d" from the read bar 14. As also shown in the drawing figure, the read bar 14 is centered on the longitudinal axis 44 and perpendicular thereto. The output line 38 from the digitizing tablet 36 is connected to digitizer position determination logic 46. The output from the digitizer position determination logic 46 is connected as an input to pixelizing output logic 48. The pixelizing output logic 48 includes a scan page buffer 50. The output from the scanner logic 16" is connected as an input to both the digitizer position determination logic 46 and the pixeling output logic 48. As those skilled in the art will readily recognize and appreciate, the various components such as the digitizer position determination logic 46, the pixeling output logic 48, and the buffer 50 can be located in various places within the overall system comprising the system 34 and a computer (not shown) using the system 34 and connected thereto. These items are shown in their present form for descriptive purposes only and such exemplary implementation should not be taken as limiting on the present invention.

With the hand scanner 40 in a static (i.e. stationary) state, the logics 46, 48 cannot tell anything about the scanner 40 except the present position of the single sensing coil 32 on the surface of the digitizing tablet 36. The longitudinal axis 44 could be anywhere within 360° passing through the center of the sensing coil 32. As soon as a user beings to move the hand scanner 40 over a document 42 in a scanning action, however, additional information is instantly available which allows the logic 46, 48 to accurately store the pixelized information coming from the read bar 14 into the buffer in its correct position and orientation. As those skilled in the art will readily recognize and appreciate, the orientation of the single sensing coil 32 along the longitudinal axis 44 with the read bar 14 centered thereon and perpendicular thereto as described above can, by itself, provide sufficient information about the scanning action to assure the benefits of the present invention with one caveat. In such case, it is imperative that the user always move the case 12 substantially along the longitudinal axis 44. Therefore, such an implementation is definitely considered within the scope and spirit of the present invention. It is preferred, however, that the rollers 20 and associated transducer 26 be provided to assure that the proper motion of the case is being employed and rate of movement data is available such that the data from the read bar 14 is assured of being accurately interpreted each time.

If rate information is deemed not necessary in the particular implementation due to the rapidity of the positional determination of the position of the sensing coil 32, the transducer 26 could be eliminated as long as the rollers 20, or equivalent, were of such construction as to prevent the case 20 from being moved other than forward and backward substantially along the longitudinal axis 44. Such an alternate approach is shown in FIG. 4 where the rollers 20 are replaced by a pair of belts 52 of a material with a high co-efficient of friction (such as polyethylene) rotationally mounted on a pair of shafts 21 moving in combination and having a large area in contact with the document 42 so as to assure proper motion only substantially along the longitudinal axis 44.

Figure 4:
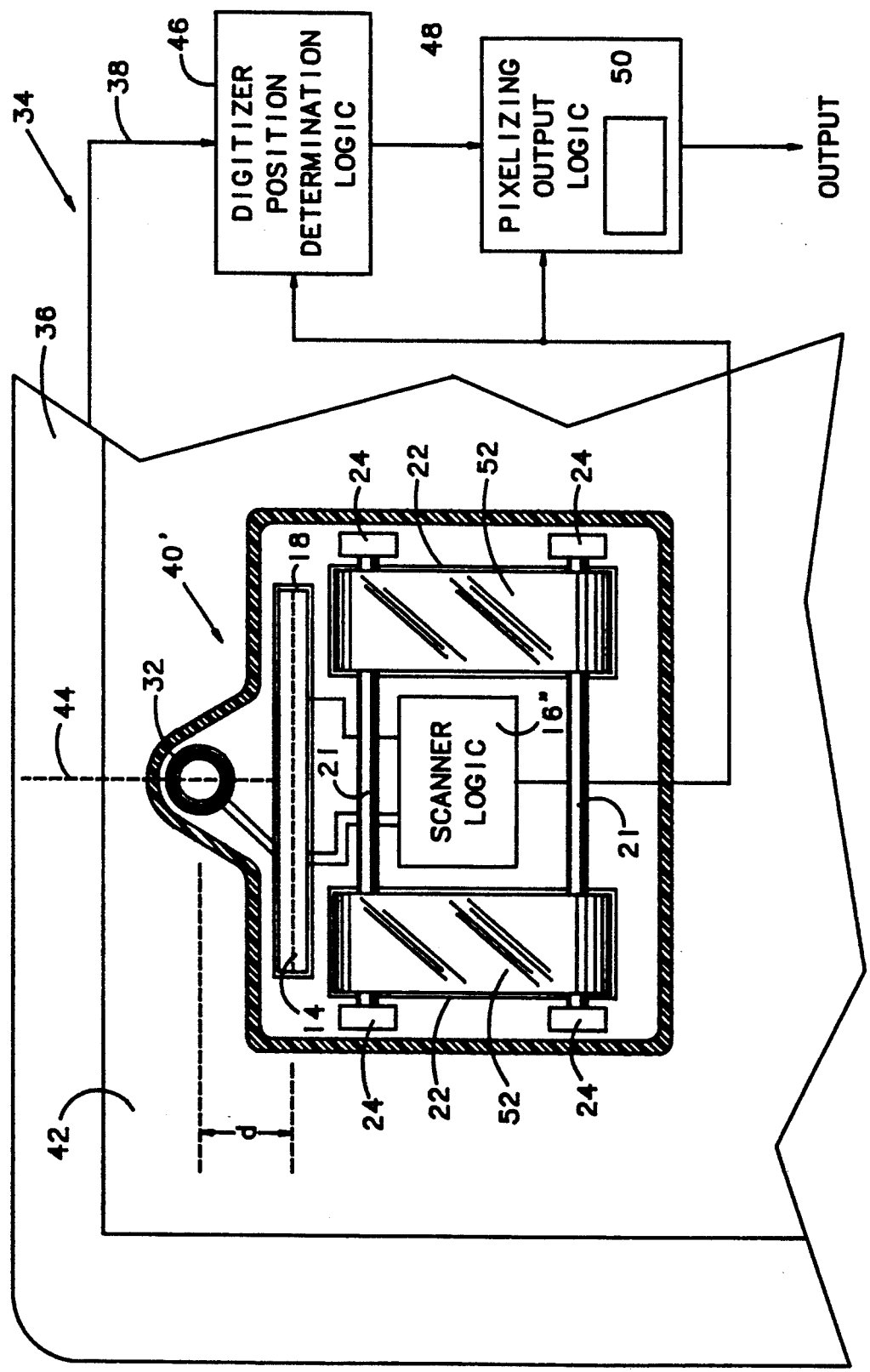
FIG. 4 is a combined drawing and functional block diagram of a hand scanner according to the present invention in a second embodiment.

Using either the approach of FIG. 3 or of FIG. 4, once scanning motion of the case 12 is assured of being substantially along the longitudinal axis 44, the position and movement of the read bar 14 on the document 42 is easily determined by the logic 46, 48. Since the position of the sensing coil 32 is always determinable, the distance, d, between the sensing coil 32 and the read bar 14 is known, and the width of the read bar 14 is known, the pixelized data from the read bar 14 can be oriented and positioned within the buffer 50 upon output thereto using standard and well known rules of geometry. Thus, data can be gathered in multiple passes and added to the buffer 50 until the total scan has been completed. As can be appreciated, therefore, if the digitizer tablet 36 is a size to accommodate "D" and "E" sized drawings, for example, the totality of the drawings can be optically scanned and input to a computer with the hand scanner 40 in multiple passes as long as the buffer 50 is sufficiently large to hold all the pixelized data of the drawing being scanned. It should be noted that since the orientation of the read bar 14 is always determined along with the instantaneous positions and motion vector thereof, the multiplepass scanning process can be accomplished without concern for the direction of the various passes or the fact that there is overlapping of the input data. Since the exact location of each pixel of the data is known, multiple passes and overlapping simply result in the data being stored in its proper location within the page memory buffer 50 multiple times.

As those skilled in the art will readily recognize and appreciate, if this multiple pass scanning of a document is to be implemented, the apparatus and associated logic must be provided with a way in which a user can clear the page memory buffer 50 prior to beginning the scanning of a new document and signal when the scanning process is completed and the data within the page memory buffer 50 is ready for use. Such techniques are will within the skill of those skilled in the art and, per se, form no part of the novelty of the present invention. Therefore, they will not be addressed herein in any detail.

Wherefore, having thus described this invention, what is claimed is:

1. A hand-operated optical scanning system comprising:
   a) a digitizing tablet containing position-sensing circuitry for outputting a signal indicating the position of a sensing coil in an x-y coordinate system associated with a working surface of said digitizing tablet;
   b) buffer memory means for receiving pixelized data associated with optical scanning of a document attached to said working surface of said digitizing tablet;
   c) a hand scanner for manual movement over said working surface of said digitizing tablet to scan a document attached to said working surface of said digitizing tablet, said hand scanner comprising,
   c1) a case having a longitudinal axis,
   c2) guide means carried by said case for allowing movement of said case over said working surface of said digitizing tablet only in a direction substantially along said longitudinal axis,
   c3) read bar means carried by said case centered on said longitudinal axis and perpendicular thereto for optically scanning a one-dimensional line of pixels and for outputting a signal reflecting an instantaneous scanned image, and
   c4) sensing coil means carried by said case centered on said longitudinal axis at a pre-established distance from said read bar means for being positionally sensed by said position-sensing circuitry of said digitizing tablet; and,
   d) logic means connected to outputs from said digitizing tablet and said read bar means and to said buffer memory means for continuously determining instantaneous positions and orientation of said read bar means in said x-y coordinate system as said hand scanner is scanned over said document attached to said working surface of said digitizing tablet, for continuously inputting said signal from said read bar means, and for storing pixelized information about said document into locations of said buffer memory means associated with respective locations of said document in said x-y coordinate system.

2. The hand-operated optical scanning system of claim 1 wherein said guide means comprises:
   roller means carried by said case for allowing said case to roll over said document only substantially along said longitudinal axis.

3. The hand-operated optical scanning system of claim 2 wherein said roller means comprises:
   a) a shaft disposed perpendicular to said longitudinal axis and carried by said case for rotation; and,
   b) a pair of rollers carried by outer ends of said shaft, said pair of rollers passing through respective ones of a pair of slots in a bottom surface of said case.

4. The hand-operated optical scanning system of claim 3 and additionally comprising:
   transducer means carried by an inner portion of said shaft for outputting a signal to said logic means reflecting rotation of said shaft and thereby movement of said case substantially along said longitudinal axis.

5. The hand-operated optical scanning system of claim 2 wherein said guide means comprises:

a) a pair of parallel spaced shafts disposed perpendicular to said longitudinal axis and carried by said case for rotation; and, b) a pair of roller belts carried by outer ends of said shafts, said pair of rollers passing through respective ones of a pair of slots in a bottom surface of said case.

6. In a digitizing tablet system having a digitizing tablet containing position-sensing circuitry for outputting a signal indicating the position of a sensing coil in an x-y coordinate system associated with a working surface of said digitizing tablet and a cursor having the sensing coil therein, the improvement to allow optical scanning of a document attached to the working surface of the digitizing tablet comprising:

a) buffer memory means for receiving pixelized data associated with optical scanning of a document attached to the working surface of the digitizing tablet;

b) the cursor comprising a hand scanner for manual movement over the working surface of the digitizing tablet to scan said document attached to the working surface of the digitizing tablet, said hand scanner comprising, b1) a case having a longitudinal axis, b2) guide means carried by said case for allowing movement of said case over the working surface of the digitizing tablet only in a direction substantially along said longitudinal axis, and b3) read bar means carried by said case centered on said longitudinal axis and perpendicular thereto for optically scanning a one-dimensional line of pixels and for outputting a signal reflecting an instantaneous scanned image, wherein b4) the sensing coil is carried by said case centered on said longitudinal axis at a pre-established distance from said read bar means; and, c) logic means connected to outputs from said digitizing tablet and said read bar means and to said buffer memory means for continuously determining instantaneous positions and orientation of said read bar means in said x-y coordinate system as said hand scanner is scanned over said document attached to the working surface of the digitizing tablet, for continuously inputting said signal from said read bar means, and for storing pixelized information about said document into locations of said buffer memory means associated with respective locations of said document in said x-y coordinate system.

7. The improvement to a digitizing tablet system of claim 6 wherein said guide means comprises:

roller means carried by said case for allowing said case to roll over a document only substantially along said longitudinal axis.

8. The improvement to a digitizing tablet system of claim 7 wherein said roller means comprises:

a) a shaft disposed perpendicular to said longitudinal axis and carried by said case for rotation; and, b) a pair of rollers carried by outer ends of said shaft, said pair of rollers through respective ones of a pair of slots in a bottom surface of said case.

9. The improvement to a digitizing tablet system of claim 8 and additionally comprising:

transducer means carried by an inner portion of said shaft for outputting a signal to said logic means reflecting rotation of said shaft and thereby movement of said case substantially along said longitudinal axis.

10. The improvement to a digitizing tablet system of claim 7 wherein said guide means comprises:

a) a pair of parallel spaced shafts disposed perpendicular to said longitudinal axis and carried by said case for rotation; and, b) a pair of roller belts carried by outer ends of said shafts, said pair of rollers passing through respective ones of a pair of slots in a bottom surface of said case.

11. In a hand-operated optical scanner for manual scanning a document and including a case having a longitudinal axis, guide means carried by the case for allowing movement of the case over said document only in a direction substantially along the longitudinal axis, and read bar means carried by the case centered on the longitudinal axis and perpendicular thereto for optically scanning a one-dimensional line of pixels and for outputting a signal reflecting an instantaneous scanned image, the improvement for allowing a large document to be scanned in multiple passes comprising:

a) a digitizing tablet containing position-sensing circuitry for outputting a signal indicating the position of a sensing coil in an x-y coordinate system associated with a working surface of said digitizing tablet upon which a document to be scanned is temporarily attached;

b) buffer memory means for receiving pixelized data associated with optical scanning of a document attached to said working surface of said digitizing tablet;

c) sensing coil means carried by the case centered on the longitudinal axis at a pre-established distance from said read bar means for being positionally sensed by said position-sensing circuitry of said digitizing tablet; and, d) logic means connected to outputs from said digitizing tablet and said read bar means and to said buffer memory means for continuously determining instantaneous positions and orientation of said read bar means in said x-y coordinate system as the hand-operated optical scanner is scanned over said document attached to said working surface of said digitizing tablet, for continuously inputting said signal from the read bar means, and for storing pixelized information about said document into locations of said buffer memory means associated with respective locations of said document in said x-y coordinate system.

12. The improvement to a hand-operated optical scanner of claim 11 wherein said guide means comprises:

roller means carried by the case for allowing the case to roll over a document only substantially along the longitudinal axis.

13. The improvement to a hand-operated optical scanner of claim 12 wherein said roller means comprises:

a) a shaft disposed perpendicular to the longitudinal axis and carried by the case for rotation; and, b) a pair of rollers carried by outer ends of said shaft, said pair of rollers passing through respective ones of a pair of slots in a bottom surface of the case.

14. The improvement to a hand-operated optical scanner of claim 13 and additionally comprising:

transducer means carried by an inner portion of said shaft for outputting a signal to said logic means reflecting rotation of said shaft and thereby movement of the case substantially along the longitudinal axis.

15. The improvement to a hand-operated optical scanner of claim 12 wherein said guide means comprises:

a) a pair of parallel spaced shafts disposed perpendicular to the longitudinal axis and carried by the case for rotation; and, b) a pair of roller belts carried by outer ends of said shafts, said pair of rollers passing through respective ones of a pair of slots in a bottom surface of the case.

* * * * *